United States Patent [19]
Kondo et al.

[11] 3,969,553
[45] July 13, 1976

[54] METHOD OF MANUFACTURING A METAL-IMPREGNATED BODY

[75] Inventors: Katsumi Kondo; Fumiyoshi Noda, both of Toyota; Kunihiko Uchida, Okazaki; Yoshihiro Tsuzuki, Toyota, all of Japan

[73] Assignee: Toyota Jidosha Kogyo Kabushiki Kaisha, Toyota, Japan

[22] Filed: Feb. 11, 1974

[21] Appl. No.: 441,227

[30] Foreign Application Priority Data

Feb. 13, 1973   Japan.................................. 48-17795

[52] U.S. Cl................................... 427/299; 75/205; 264/48; 264/111; 264/DIG. 36; 427/314; 427/431
[51] Int. Cl.² ........................................... B22F 3/26
[58] Field of Search.................... 29/182.1; 75/205; 264/111, 48, DIG. 36; 117/22, 47 R, 100 B, 160 R, 70 R, 114 R, 114 A, 114 C; 427/299, 243, 314, 431

[56]   References Cited
UNITED STATES PATENTS

| | | | |
|---|---|---|---|
| 2,733,161 | 1/1956 | Lytton............................ | 117/71 R X |
| 2,922,721 | 1/1960 | Tarkan et al. ................. | 29/182.1 X |
| 3,725,015 | 3/1973 | Weaver............................. | 29/182.1 |

Primary Examiner—Ralph S. Kendall
Assistant Examiner—John D. Smith
Attorney, Agent, or Firm—Brisebois & Kruger

[57]   ABSTRACT

The present invention relates to a method of manufacturing a metal-impregnated body by immersing a porous ceramic or ceramic powder in a solution containing a chemical compound having an OH radical selected from the group consisting of water and aqueous solutions of methanol, ethanol, butanol, acetone, acetic acid and ammonium hydroxide; drying and molding it into a porous body; and then impregnating said porous body with a molten metal.

8 Claims, 1 Drawing Figure

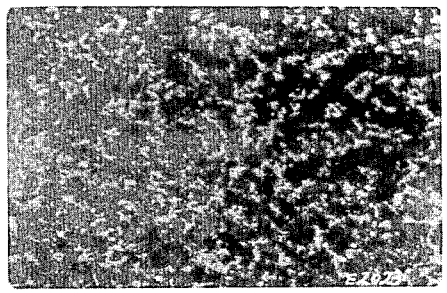

METHOD OF MANUFACTURING A METAL-IMPREGNATED BODY

BACKGROUND OF THE INVENTION

In the conventional method of impregnating a ceramic body with metal, high impregnating pressure has to be applied on account of the poor wettability of ceramic by metal. Even when a ceramic is thus impregnated with metal, however, the metal-impregnated body obtained has a low strength and the variation in its strength is usually wide.

SUMMARY OF THE INVENTION

The object of the present invention is to provide a method of manufacturing a metal-impregnated body having a high breaking strength, characterized by the step of improving the wettability of a porous ceramic or ceramic powder and thereby facilitating the impregnation of the ceramic with metal.

BRIEF DESCRIPTION OF THE DRAWING

The single FIGURE is a photograph showing the microstructure of a metal-impregnated body produced in accordance with the present invention.

DETAILED DESCRIPTION OF THE INVENTION

The present inventors as the result of investigations into the manufacture of metal-impregnated body discovered that the impregnation of ceramic with metal could be facilitated by improving the ceramic-to-metal wettability by immersing a porous ceramic or ceramic powder in a solution containing a chemical compound having an OH radical and the present invention is based on this discovery.

The advantages of the process according to the invention over conventional processes are that there is no need to utilize high pressure for impregnation with metal; the metal-impregnated body obtained is very strong; and the variance in strength is small.

The process according to the invention can be carried out in either of the following ways:

According to the first method, a porous body of nitride ceramic is molded. This body is immersed in a solution of a chemical compound having an OH radical and then left standing or boiled in the solution until the solution amply fills the pores in said body. After this treatment the porous body is dried and then impregnated with a molten metal.

According to the second method a powder of nitride ceramic is immersed in a solution of a chemical compound having an OH radical and then left standing or boiled in the solution until the solution amply penetrates said powder. The muddy material thus obtained is dried and ground or screened to a desirable particle size. The resulting nitride ceramic powder is molded into a porous body of the desired shape, which is then impregnated with a molten metal.

The following ceramic materials are suitable for use in this process: titanium nitride, boron nitride, silicon nitride, vanadium nitride, silicon oxynitride, niobium nitride, tantalum nitride, beryllium nitride, and zirconium nitride.

The following impregnating metals are suitable for use in this process: iron, aluminum, silver, magnesium, copper, zinc and their alloys.

When, according to the present invention, a nitride ceramic is treated with a solution of a chemical compound having an OH radical, the nitride ceramic is partially decomposed, exposing an active surface, thereby improving the wettability of the ceramic by a molten metal and facilitating the impregnation.

Several examples of methods of carrying out the invention are given below:

EXAMPLE 1

Metallic silicon of −250 mesh was molded under a pressure of 1000 kg/cm$^2$ and sintered in a nitrogen atmosphere. The sintered silicon nitride (porosity 25%) obtained in this manner was immersed in water and boiled for 30 minutes. The sintered body obtained was dried for 2 hours in a drying furnace at 100°C and thereafter impregnated with an aluminum alloy (JIS-AC8A comprising Cu 0.8–1.3%, Si 11.0–13.0%, Mg 0.7–1.3%, Zn below 0.1%, Fe below 0.89%, Mn below 0.1%, Ni 1.0–2.5%, Ti below 0.2%, Remainder Al) at 750°C in an autoclave at 25 atmospheres.

The breaking strength of the metal-impregnated body obtained in this manner was 39 kg/mm$^2$, which was found as the magnitude of load under which the specimen (10×35×6mm) supported on a 30mm span and loaded at midpoint at a rate of 0.2mm/min was broken.

FIG. 1 is a micrograph (× 400) showing the structure of a metal-impregnated ceramic obtained according to the present invention.

REFERENCE EXAMPLE 1

Sintered silicon nitride (porosity 25%) obtained in the same way as in Example 1 was, without being first immersed in water, treated in an autoclave in the same way as in Example 1. The silicon nitride did not become impregnated under a pressure of 25 atmospheres. 45 atmospheres was required. The breaking strength of the product was 34 kg/mm$^2$.

EXAMPLE 2

Specimens of sintered silicon nitride (porosity 25%) obtained in the same way as in Example 1, were immersed in a 50% aqueous solution of methanol, ethanol, butanol, acetone, acetic acid, and ammonium hydroxide; boiled for 30 minutes; dried at 100°C for 3 hours; and then subjected to the same treatment in the autoclave as in Example 1. The breaking strength of each metal-impregnated body is listed in Table 1.

Table 1

| Solution | Breaking strength - Kg/mm$^2$ |
| --- | --- |
| Methanol | 45.2 |
| Ethanol | 46.1 |
| Acetone | 42.5 |
| Acetic acid | 43.3 |
| Ammonium hydroxide | 46.5 |
| Butanol | 45.6 |

EXAMPLE 3

200g of silicon nitride powder of −250 mesh, and 100g of water were ground and agitated in a ball mill. After 5 hours, the contents of the mill were taken out; dried at 150°C for 3 hours; and passed through a 100-mesh screen. The resulting powder was pressed and molded in a metal mold under a pressure of 1000 kg/cm$^2$ (density of product: 1.8g/cm$^3$).

The molded product was rubber-pressed under a pressure of 2000 kg/cm$^2$ into 5 pieces (density: 2.0 g/cm$^3$), which were impregnated with an aluminum alloy (JIS-AC7B comprising Cu below 0.1%, Si below 0.3%, Mg 9.5-11.0%, Zn below 0.1%, Fe below 0.4%, Ti below 0.2%, Mg below 0.1%, Remainder Al) at 750°C in an autoclave under a pressure of 30 atmospheres. The breaking strengths of these pieces were 39.6, 40.3, 42.2, 39.8 and 43.6 kg/cm$^2$, respectively.

REFERENCE EXAMPLE 2

Metal-impregnated pieces were produced in the same way as in Example 3, except that 98% normal hexane was used instead of water. Their anti-breaking strengths were 21.6, 29.3, 25.8, 33.6 and 34.5 kg/mm$^2$. These values are lower than in Example 3 and show a wider variation.

EXAMPLE 4

Sintered pieces of Be$_3$N$_2$, BN, AlN, ZrN, TaN, NbN and VN were immersed respectively in a 50% aqueous solution of methanol, ethanol, acetone, acetic acid, ammonium hydroxide and butanol and treated under the same conditions as in Example 2.

The results are listed in Table 2.

Table 2

| Solution | Breaking strength (kg/mm$^2$) | | | | | | |
|---|---|---|---|---|---|---|---|
| | Be$_3$N$_2$ | BN | AlN | ZrN | TaN | NbN | VN |
| Methanol | 32 | 25 | 37 | 43 | 29 | 33 | 31 |
| Ethanol | 29 | 26 | 34 | 39 | 37 | 36 | 35 |
| Acetone | 37 | 23 | 38 | 35 | 28 | 29 | 28 |
| Acetic acid | 34 | 27 | 32 | 38 | 27 | 28 | 34 |
| Ammonium hydroxide | 38 | 24 | 33 | 41 | 36 | 38 | 40 |
| Butanol | 28 | 29 | 35 | 33 | 31 | 33 | 29 |
| Control | 19 | 13 | 20 | 25 | 24 | 18 | 17 |

What is claimed is:

1. A method of manufacturing a nitride ceramic impregnated with a molten metal comprising the steps of treating a porous shaped or powdered nitride ceramic with a liquid or solution containing a compound having an OH radical, said solution or liquid selected from the group consisting of water or an aqueous solution of methanol, ethanol, butanol, acetone, acetic acid, or ammonium hydroxide, drying said ceramic to expose an active ceramic surface, molding said ceramic into a solid body before it is impregnated with a molten metal and impregnating said ceramic with a molten metal which remains in substantially uncombined form after impregnation.

2. The method of claim 1 in which said ceramic is molded into a solid body before it is treated with said compound having an OH radical.

3. The method of claim 1 in which said treated ceramic is in the form of a powder which is molded into a solid body after it is treated with said compound having an OH radical.

4. The method of claim 1, in which said treating solution is a 50% aqueous solution of methanol, ethanol, butanol, acetone, acetic acid or ammonium hydroxide.

5. The method of claim 1 in which said liquid is water.

6. The method of claim 1, wherein a ceramic powder of −250 mesh in particle size is employed.

7. The method of claim 1, wherein said nitride ceramic is selected from the group consisting of titanium nitride, boron nitride, silicon nitride, vanadium nitride, silicon oxynitride, niobium nitride, tantalum nitride, beryllium nitride and zirconium nitride.

8. The method of claim 1, wherein said molten metal is selected from the group consisting of iron, aluminum, silver, magnesium, copper, zinc, and alloys thereof.

* * * * *